US006976700B2

(12) United States Patent
McCann et al.

(10) Patent No.: US 6,976,700 B2
(45) Date of Patent: Dec. 20, 2005

(54) AIR BAG INFLATOR BRACKET

(75) Inventors: Matthew J. McCann, Roseville, MI (US); Gabriel Anaya, Shelby Township, MI (US); Attila K. Dalkilic, Aschaffenburg (DE); Wolfgang O. Bareiss, Gschwend (DE)

(73) Assignees: TRW Vehicle Safety Systems Inc., Lyndhurst, OH (US); TRW Occupant Restraint Systems GmbH & Co. KG, Alfdorf (DE); TRW Automotive Safety Systems GmbH & Co. KG, Aschaffenburg (DE)

( * ) Notice: Subject to any disclaimer, the term of this patent is extended or adjusted under 35 U.S.C. 154(b) by 60 days.

(21) Appl. No.: 10/292,347

(22) Filed: Nov. 12, 2002

(65) Prior Publication Data

US 2004/0090049 A1 May 13, 2004

(51) Int. Cl.$^7$ ............................................. B60R 21/16
(52) U.S. Cl. ............................... 280/728.2; 280/730.2
(58) Field of Search .................. 280/728.2, 730.2, 280/732

(56) References Cited

U.S. PATENT DOCUMENTS

| 3,567,245 | A | | 3/1971 | Ekstrom |
| 4,153,273 | A | | 5/1979 | Risko |
| 4,981,534 | A | | 1/1991 | Scheffee |
| 5,062,664 | A | | 11/1991 | Bishop et al. |
| 5,131,680 | A | | 7/1992 | Coultas et al. |
| 5,195,777 | A | | 3/1993 | Cuevas |
| 5,308,108 | A | | 5/1994 | Rion |
| 5,348,342 | A | | 9/1994 | Haland et al. |
| 5,433,472 | A | * | 7/1995 | Green et al. ............. 280/728.2 |
| 5,458,362 | A | | 10/1995 | Buchanan et al. |
| 5,468,012 | A | | 11/1995 | Mihm |
| 5,484,163 | A | | 1/1996 | Jenkins |
| 5,558,362 | A | | 9/1996 | Acker et al. |
| 5,564,739 | A | | 10/1996 | Davidson |
| 5,611,563 | A | | 3/1997 | Olson et al. |

(Continued)

FOREIGN PATENT DOCUMENTS

EP     0694446 A2    1/1996

OTHER PUBLICATIONS

Photographs illustrating various inflator bracket configurations.

*Primary Examiner*—Paul N. Dickson
*Assistant Examiner*—Laura B. Rosenberg
(74) *Attorney, Agent, or Firm*—Tarolli, Sundheim, Covell & Tummino L.L.P.

(57) ABSTRACT

Apparatus (10) includes an air bag (30) and an inflator (40) for inflating the air bag. The apparatus (10) also includes a bracket (120) having an elongated back plate portion (122), a first flange portion (130), and a second flange portion (150). The flange portions (130 and 150) extend transverse to the back plate portion (122). The inflator (40) is insertable into the bracket. A first end portion (80) of the inflator (40) engages the first flange portion (130) and a second end portion (90) of the inflator engages the second flange portion (150) while the inflator is inserted in the bracket (120). The inflator (40) urges the first and second flange portions (130 and 150) to deflect away from each other while the inflator is inserted in the bracket (120). The first and second flange portions (130 and 150) are urged toward each other by resilience of the bracket and exert a clamping force on the inflator (40) to retain the inflator in the bracket (120). The apparatus (10) includes no other provisions for connecting the inflator (40) to the bracket (120).

22 Claims, 6 Drawing Sheets

U.S. PATENT DOCUMENTS

| | | | |
|---|---|---|---|
| 5,639,112 A * | 6/1997 | Phillion et al. | 280/728.2 |
| 5,687,988 A * | 11/1997 | Storey et al. | 280/728.2 |
| 5,700,028 A | 12/1997 | Logan et al. | |
| 5,799,970 A * | 9/1998 | Enders | 280/730.2 |
| 5,918,898 A | 7/1999 | Wallner et al. | |
| 5,944,340 A * | 8/1999 | Bohn et al. | 280/728.2 |
| 5,947,510 A * | 9/1999 | Athon et al. | 280/728.2 |
| 6,193,270 B1 * | 2/2001 | Thomas | 280/728.2 |
| 6,227,560 B1 | 5/2001 | Volkmann et al. | |
| 6,247,721 B1 * | 6/2001 | Lang | 280/728.2 |
| 6,299,200 B1 | 10/2001 | Bowers et al. | |
| 6,364,348 B1 * | 4/2002 | Jang et al. | 280/730.2 |
| 6,422,589 B1 * | 7/2002 | Ostermann et al. | 280/728.2 |

* cited by examiner

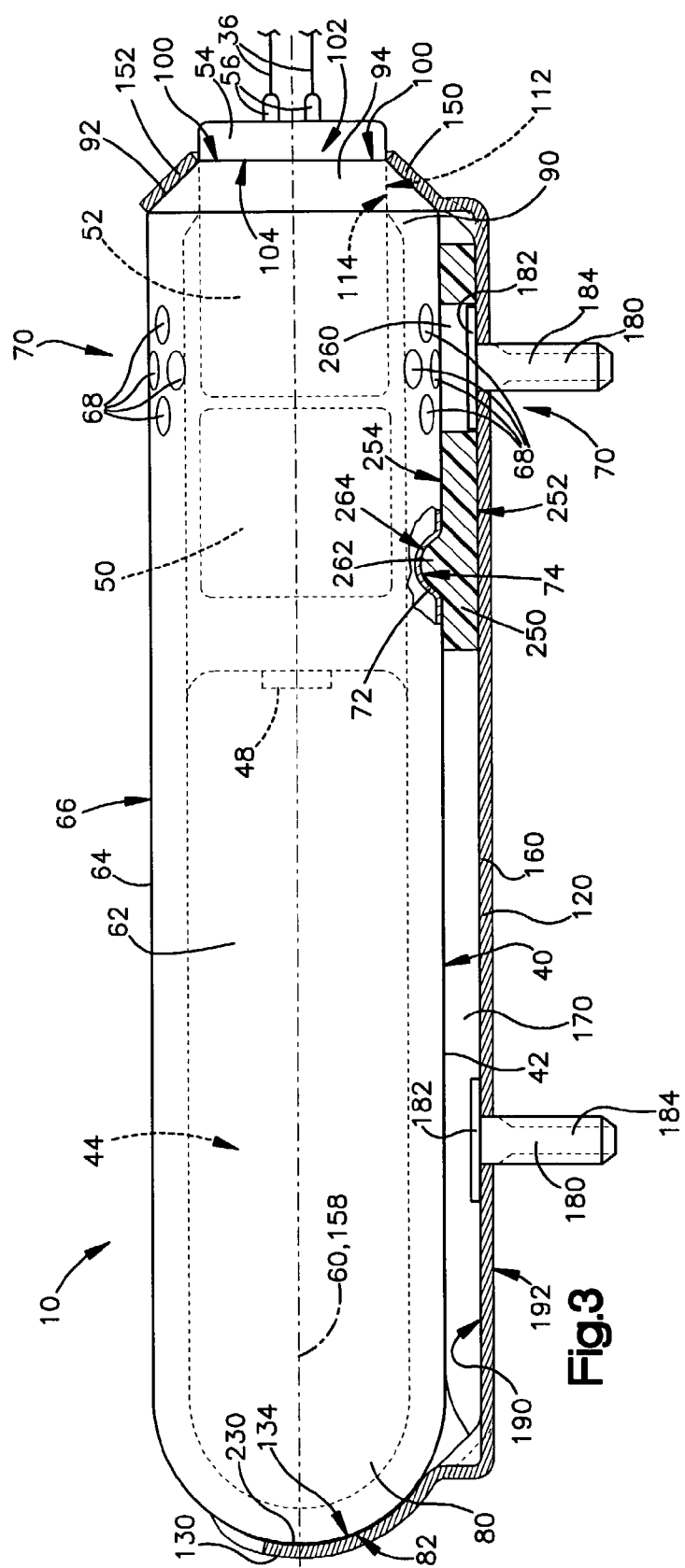

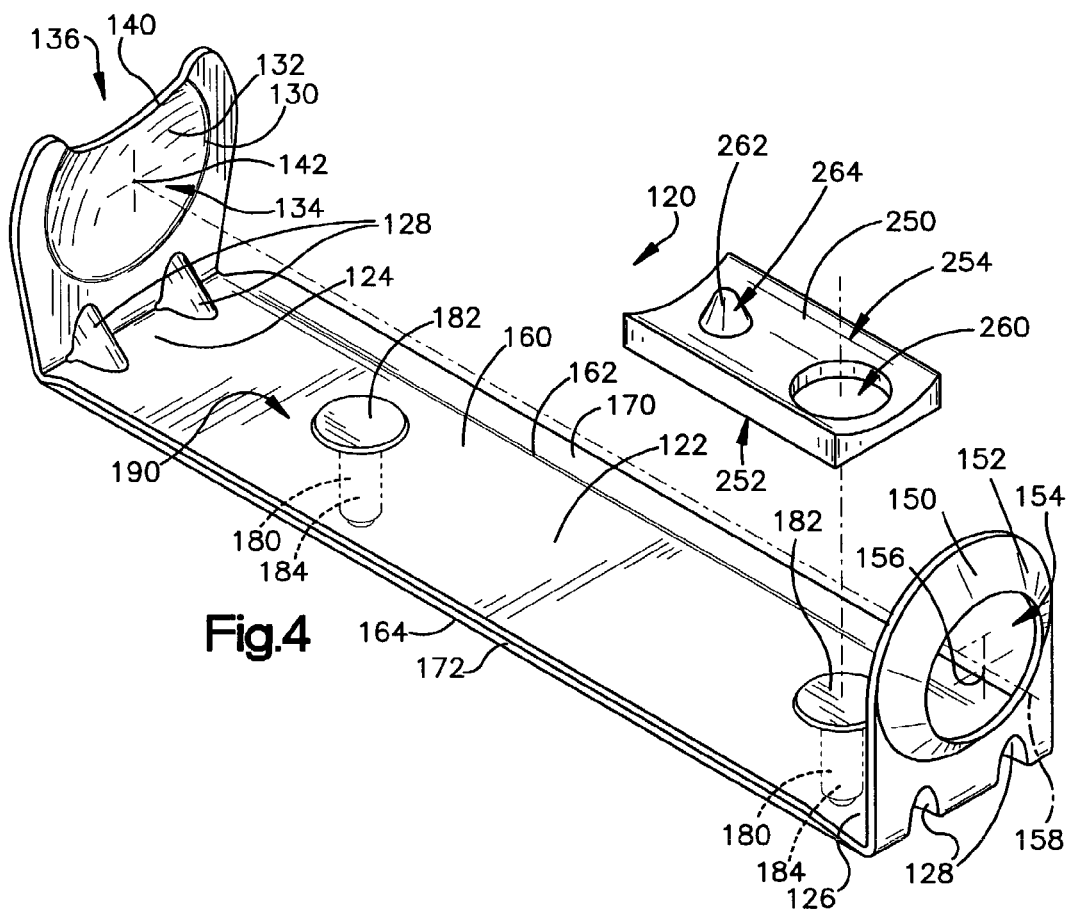
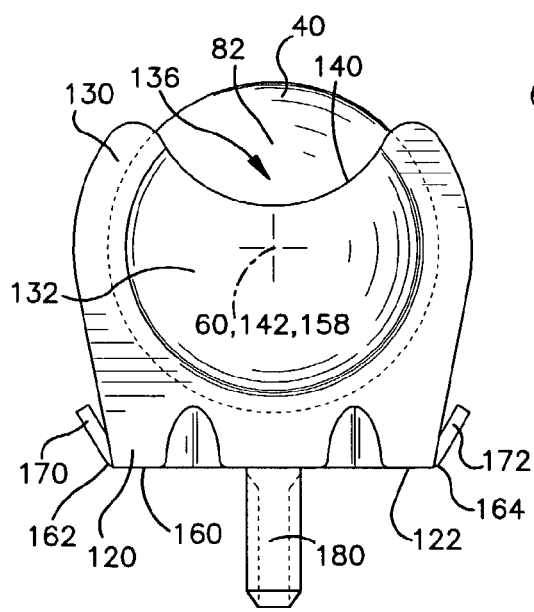
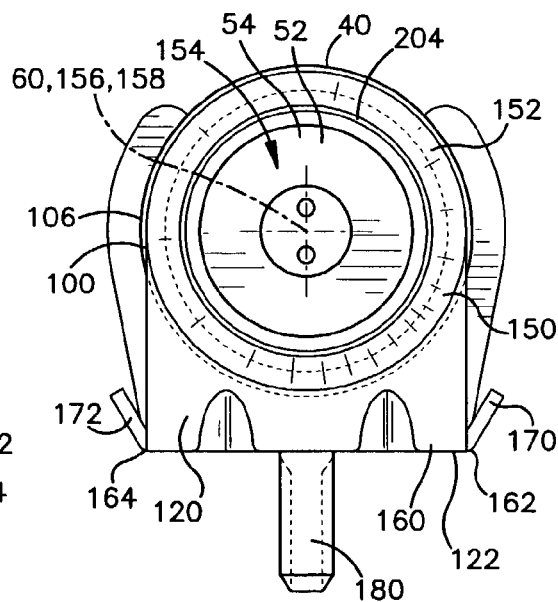

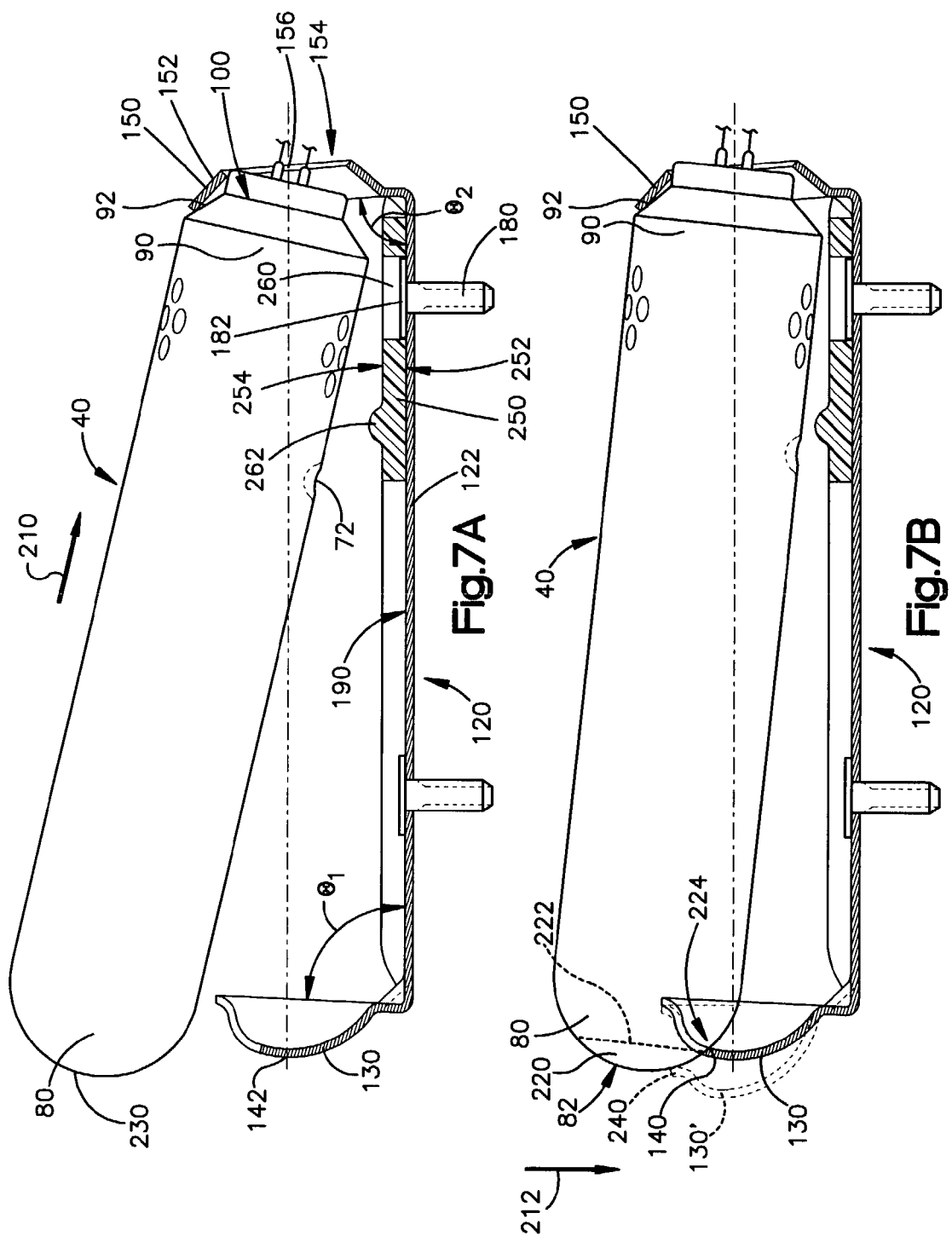

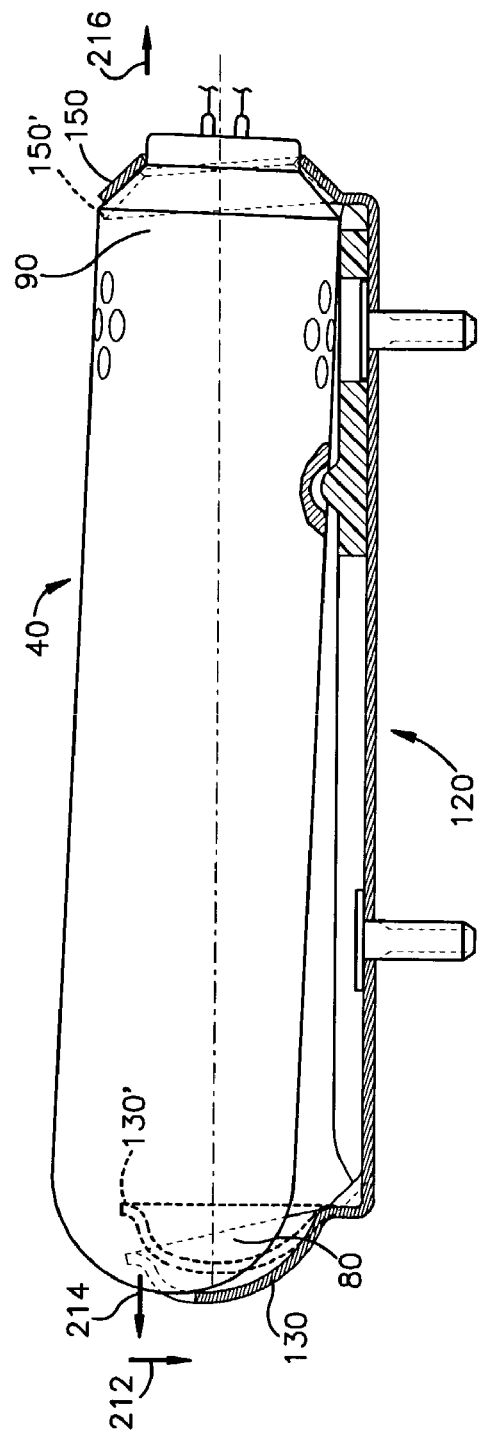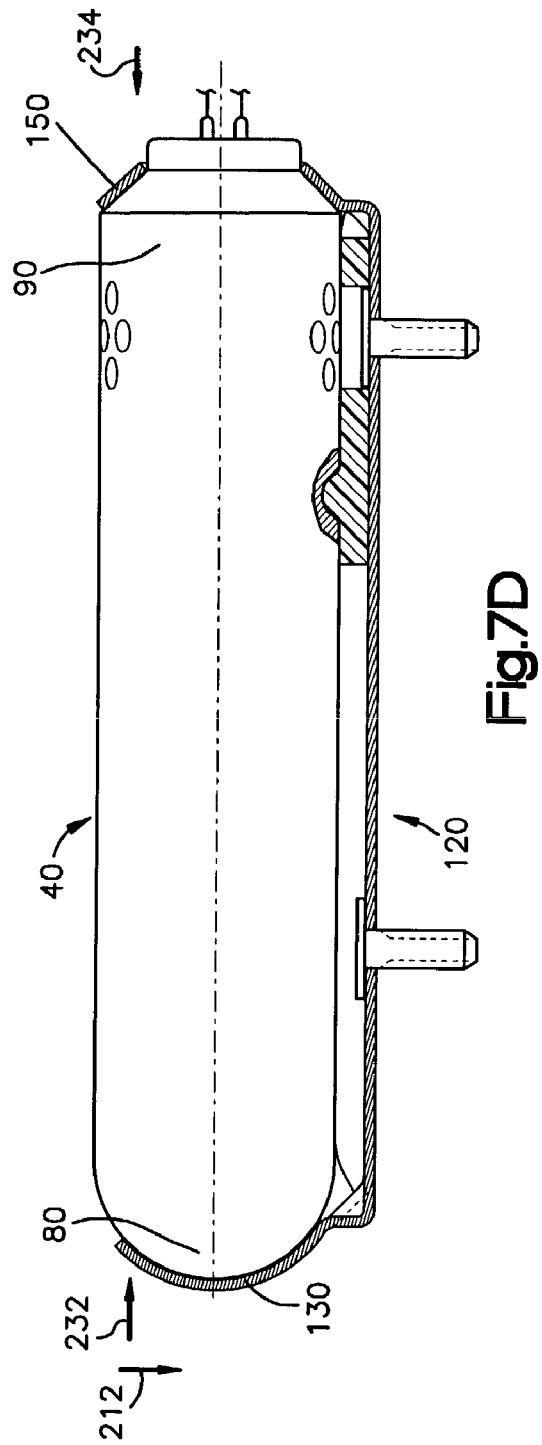

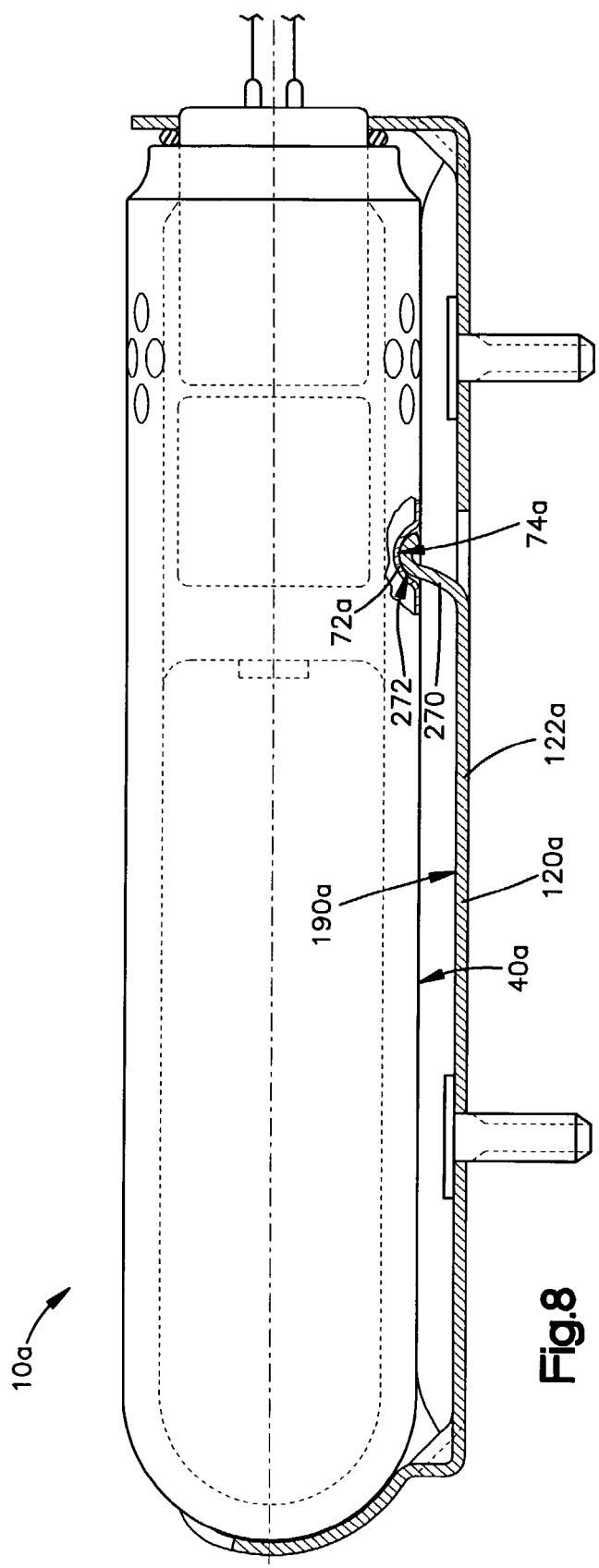

US 6,976,700 B2

AIR BAG INFLATOR BRACKET

FIELD OF THE INVENTION

The present invention relates to an apparatus for helping to protect an occupant of a vehicle. In particular, the present invention relates to a bracket for supporting in a vehicle an inflator for inflating an inflatable vehicle occupant protection device.

BACKGROUND OF THE INVENTION

It is known to inflate an inflatable vehicle occupant protection device to help protect an occupant of a vehicle upon the occurrence of an event for which occupant protection is desired. One particular type of inflatable vehicle occupant protection device is a side impact air bag inflatable upon the occurrence of a side is impact to the vehicle or a vehicle rollover. Upon the occurrence of an event for which occupant protection is desired, the inflator is actuated, and the air bag is inflated into a position between the vehicle occupant and structure of the vehicle. The air bag while inflated helps protect the vehicle occupant from impacts with the vehicle structure.

The side impact air bag is typically a part of a module that includes an inflator for providing inflation fluid for inflating the air bag and a structure, such as a bracket or housing, for supporting the air bag and inflator in the vehicle. In one particular configuration, the side impact air bag module is supported in a seat of the vehicle. The side impact air bag is inflatable to a position between the side structure of the vehicle and the vehicle occupant.

SUMMARY OF THE INVENTION

The present invention relates to an apparatus that includes an air bag and an inflator for inflating the air bag. The apparatus also includes a bracket having an elongated back plate portion, a first flange portion, and a second flange portion. The flange portions extend transverse to the back plate portion. The inflator is insertable into the bracket. A first end portion of the inflator engages the first flange portion and a second end portion of the inflator engages the second flange portion while the inflator is inserted in the bracket. The inflator urges the first and second flange portions to deflect away from each other while the inflator is inserted in the bracket. The first and second flange portions are urged toward each other by resilience of the bracket and exert a clamping force on the inflator to retain the inflator in the bracket. The apparatus is free from any other means for connecting the inflator to the bracket.

The present invention also relates to a bracket for supporting an airbag inflator in a vehicle. The inflator has a first end portion with a domed outer surface and an opposite second end portion. The bracket includes an elongated back plate portion and first and second flange portions. The first flange portion extends from a first end of the back plate portion in a direction transverse to the back plate portion. The second flange portion extends from a second end of the back plate portion, opposite the first end, in a direction transverse to the back plate portion. The first flange portion has a domed portion with a domed surface for receiving the domed outer surface of the first end portion of the inflator. The first flange portion includes a notch in the domed portion positioned radially opposite the back plate portion for providing a clearance through which a terminal end portion of the first end portion of the inflator extends while being inserted into the bracket. The second flange portion receives the second end portion of the inflator.

The present invention also relates to an apparatus for helping to protect an occupant of a vehicle. The apparatus includes an inflatable vehicle occupant protection device inflatable from a deflated condition to an inflated condition and an inflator actuatable to provide inflation fluid for inflating the protection device. The inflator has a first end portion with a convex domed outer surface and an opposite second end portion. The apparatus further includes a bracket including an elongated back plate portion and spaced first and second flange portions that extend transverse to the back plate portion. The first flange portion has a domed portion with a domed surface for receiving the domed outer surface of the first end portion. The domed portion includes a notch that provides a clearance through which a terminal end portion of the first end portion of the inflator extends while the inflator is inserted into the bracket. The second flange portion receives the second end portion of the inflator.

The present invention further relates to an apparatus including an inflatable vehicle occupant protection device that is inflatable from a deflated condition to an inflated condition and an inflator actuatable to provide inflation fluid for inflating the protection device. The apparatus also includes a bracket for supporting the inflator. The inflator and the bracket have cooperating portions, some of which deflect to enable the inflator and bracket to snap together into an assembled unit. The apparatus does not include any other means for connecting the inflator to the bracket.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3 is a partial sectional view taken generally along line 3—3 in FIG. 2 of a portion of the air bag module;

FIG. 4 is a perspective view of a portion of the air bag module, according to the first embodiment of the present invention;

FIGS. 5 and 6 are end views of portions of the air bag module, according to the first embodiment of the present invention;

FIGS. 7A–7D illustrate the assembly of a portion of the air bag module, according to the first embodiment of the present invention; and FIG. 8 is a partial sectional view of a portion of the air bag module of FIG. 1, according to a second embodiment of the present invention.

DESCRIPTION OF AN EMBODIMENT

Figure 2:
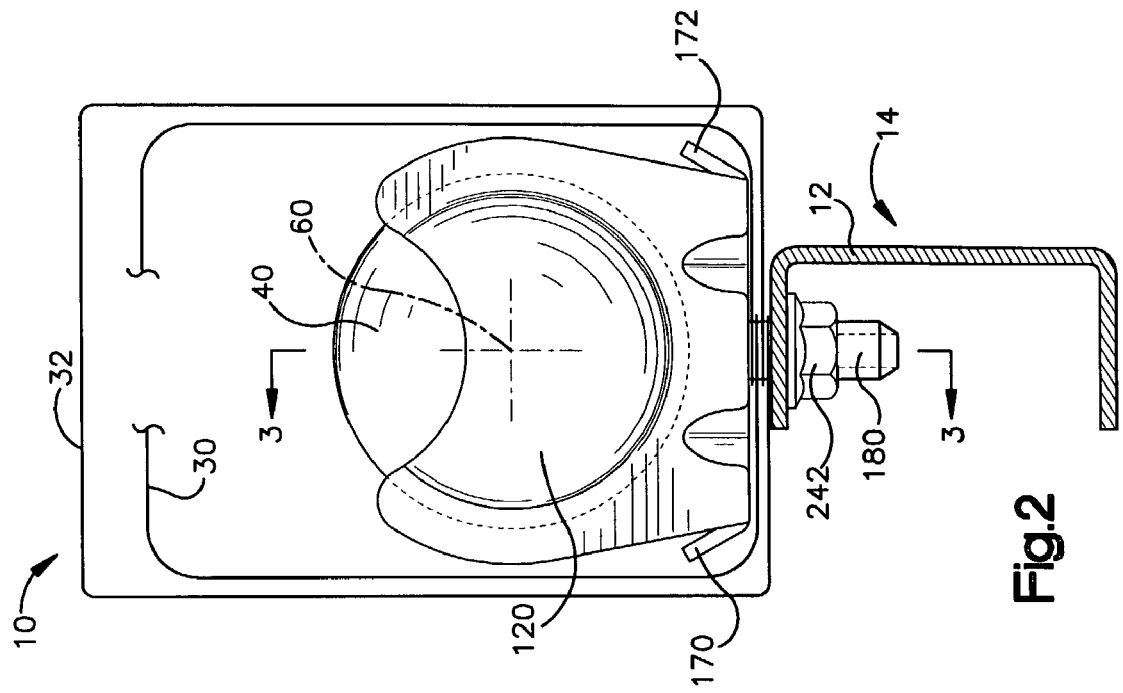
FIG. 2 is a schematic view, partially in section, of a portion of the air bag module of FIG. 1, according to a first embodiment of the present invention.
Figure 1:
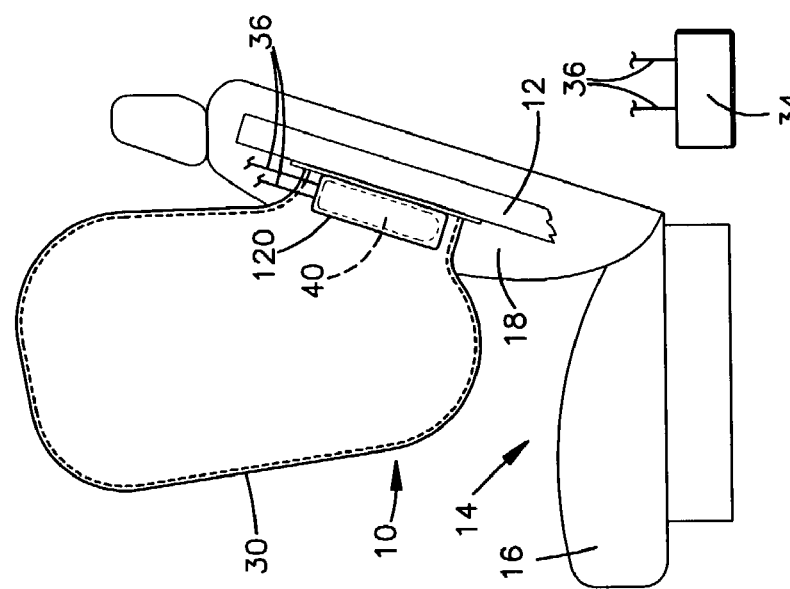
FIG. 1 is a schematic side view of a vehicle seat and an air bag module constructed in accordance with the present invention, showing the air bag in an inflated condition.

The present invention relates to an apparatus for helping to protect a vehicle occupant upon the occurrence of an event for which occupant protection is desired, such as a side impact to the vehicle and/or a vehicle rollover. The present invention is applicable to various vehicle occupant safety apparatus configurations. Representative of the present invention, FIGS. 1 and 2 illustrate a vehicle occupant safety apparatus in the form of an air bag module 10.

The air bag module 10 (FIG. 1) is connected with a seat frame member 12 of a vehicle seat 14 for supporting an occupant of a vehicle (not shown). The seat 14 includes a seat bottom 16 and a seatback 18 connected with the seat bottom.

The air bag module 10 includes an inflatable vehicle occupant protection device, illustrated schematically at 30, referred to herein as an air bag. The air bag 30 may have any known shape or configuration and may be constructed of any material suited for use as an air bag, such as fabric (coated or non-coated) or plastic film. The air bag module 10 also includes a cover or housing indicated schematically at 32 (FIG. 2) which encloses the air bag 30 in a folded and stored condition. The housing 32 is opened by the inflating air bag 30 to allow the air bag to inflate to a deployed position to help protect an occupant of the vehicle seat 14. The air bag module 10, including the housing 32, is located within the vehicle seatback 18 (FIG. 1) underneath the foam cushion material and/or fabric covering or leather covering of the seat 14.

The air bag module 10 also includes an inflator 40 for providing inflation fluid for inflating the air bag 30. As represented in the illustrated embodiment, the inflator 40 may be a hybrid or augmented inflator that includes a volume of inflation fluid stored under pressure and a pyrotechnic material ignitable to heat the stored inflation fluid and, in some configurations, to provide additional inflation fluid. The inflator 40 could, however, have an alternative configuration. For example, the inflator 40 could be a stored gas inflator including a volume of pressurized inflation fluid for inflating the air bag 30. Alternatively, the inflator 40 could be a pyrotechnic inflator in which a pyrotechnic material is ignitable to provide inflation fluid for inflating the air bag 30. As a further alternative, the inflator 40 may be of any configuration or type suited to provide inflation fluid for inflating the air bag 30.

The vehicle in which the air bag module 10 is mounted includes means indicated schematically at 34 for sensing an event for which occupant protection is desired. The means 34 is operable to actuate the inflator 40 in response to the sensed event. The means 34 may include a side impact sensor, such as an accelerometer or crush sensor, and vehicle circuitry for electrically actuating the inflator 40 in response to sensing a side impact to the vehicle above a predetermined threshold and/or a vehicle rollover. The means 34 is electrically connected to the inflator 40 by lead wires 36 and is operable to provide an actuation signal to the inflator via the lead wires.

Referring to FIG. 3, the inflator 40 includes a container portion 42 that defines an inflation fluid chamber 44. The inflation fluid chamber 44 contains a stored quantity of pressurized inflation fluid. At one end of the inflation fluid chamber 44 is a rupturable portion of the container or a rupturable member such as a burst disk 48. An ignitable material 50 is disposed within the container portion 42 at a location adjacent to the inflation fluid chamber 44. The ignitable material 50, when ignited, provides additional inflation fluid and heat for helping to inflate and pressurize the air bag (not shown in FIG. 3).

An electrically actuatable initiator 52 is connected to the container portion 42 and disposed adjacent the ignitable material 50. The initiator 52, when actuated, ignites the ignitable material 50 and opens the inflation fluid chamber 44. A pair of terminals 56 extend from a cylindrical end portion 54 of the initiator 52 and are connectable to the lead wires 36 in a known manner. The terminals 56 and the lead wires 36 thus operatively connect the inflator 40, more specifically the initiator 52, to the sensor 34 (FIG. 1).

The inflator 40 (FIG. 3) has a generally cylindrical configuration centered on a longitudinal axis 60. A central portion 62 of the inflator 40 includes a cylindrical side wall 64 of the inflator. The side wall 64 has a cylindrical outer surface 66. The central portion 62 of the inflator 40 also includes a plurality of fluid outlets 68 that are arranged in groups 70 spaced radially opposite each other (i.e., about 180°) around the circumference of the inflator. The fluid outlets 68 and/or groups 70 could, however, be spaced and/or arranged in an alternative manner. The fluid outlets 68 provide a passage through which inflation fluid may flow from the inflator 40 when the inflator is actuated.

A first end portion 80 of the inflator 40 has a domed configuration including a convex domed outer surface 82. The domed outer surface 82 of the first end portion 80 of the inflator 40 merges with the cylindrical outer surface 66 of the central portion 62 of the inflator.

A second end portion 90 of the inflator 40 has a tapered portion 92 in which the side wall 64 is tapered inward at an acute angle toward the axis 60 from the outer surface 66 of the central portion 62. In the embodiment illustrated in FIGS. 1–7D, the acute angle is about 45 degrees. The tapered portion 92 terminates in an annular end surface 100 of the side wall 64.

The end surface 100 forms a circular opening 102 into which the initiator 52 is inserted. Once inserted, the initiator 52 is secured to the container portion 42 by known means, such as welding, adhesives, fasteners, and material deformation. An annular surface 104 of the end portion 54 of the initiator 52 is positioned in abutting engagement with the end surface 100 of the side wall 64. The initiator 52, when positioned in the opening 102, has an outer surface 112 that engages an annular inner surface 114 of the neck portion 94.

The inflator 40 includes an indentation or depression 72 that extends into the outer surface 66 of the side wall 64. The depression 72 has a smoothly curved and recessed configuration that forms a concave surface 74. The depression 72 is aligned longitudinally with one of the groups 70 of diffuser ports 68 of the inflator 40.

Referring to FIGS. 1 and 2, the air bag module 10 also includes a bracket 120 for supporting the inflator 40 in the vehicle. The bracket 120 may also help support the air bag 30 and the housing 32 in the vehicle. In the illustrated embodiment, the bracket 120 is connectable to the seat frame 12 of the vehicle seat 14. The bracket 120 could, however, be connected to the vehicle at alternative locations, such as the side structure (not shown) of the vehicle.

The bracket 120 is constructed of a single piece of material and has an elongated configuration. The bracket 120 is not made of plural pieces of material that are fastened together. The material used to construct the bracket 120 may be any material, such as metal or plastic, having material properties (e.g., strength and hardness) suited for supporting the inflator 40 in the vehicle. In a preferred embodiment, the bracket 120 has a steel construction and is constructed by stamping the steel to a predetermined pattern or shape and then bending or otherwise deforming the steel to the illustrated form.

Referring to FIG. 4, the bracket 120 includes a back plate portion 122 having opposite first and second ends indicated at 124 and 126, respectively. The bracket 120 also includes a first flange portion 130 extending from the first end 124 of the back plate portion 122 in a direction transverse to the back plate portion. The bracket 120 also includes a second flange portion 150 extending from the second end 126 of the back plate portion 122 in a direction transverse to the back plate portion. The first and second flange portions 130 and 150 extend generally parallel to each other and perpendicular to the back plate portion 122. The first and second flange portions 130 and 150 may extend at slight acute angles toward each other, as will be discussed further below.

The bracket 120 may include reinforcing portions 128 that extend between the back plate portion 122 and the first and second flange portions 130 and 150, respectively. In the embodiment illustrated in FIG. 4, two reinforcing portions 128 extend between the back plate portion 122 and the first flange portion 130 and two reinforcing portions extend between the back plate portion and the second flange portion 150. The reinforcing portions 128 comprise portions of the bracket 120 in which the bracket material is deformed to help strengthen or make rigid the intersection where the first and second flange portions 130 and 150 merge with the back plate portion 122. This may help to increase the extent to which the first and second flange portions 130 and 150 resist deflection relative to the back plate portion 122 and relative to each other. This also may help to increase the resilience of the first and second flange portions 130 and 150, i.e., the post-deflection tendency of the first and second flange portions to return to the normal position of FIG. 4.

The first flange portion 130 has a domed portion 132 that forms a concave domed surface 134. The domed surface 134 is presented facing inward toward the back plate portion 122 and toward the second flange portion 150. Referring to FIGS. 4 and 5, the first flange portion 130 also includes a notch 136. The notch 136 has a curved edge 140 that extends into the domed portion 132 at a location radially opposite the intersection of the first flange portion 130 and the back plate portion 122. The notch 136 terminates vertically above an apex 142 of the domed portion 132. The notch 136 could, however, have an alternative shape or vertical extent.

Referring to FIGS. 4 and 6, the second flange portion 150 includes a rim portion 152 that defines a circular aperture 154. As shown in FIGS. 4–6, a center 156 of the circular aperture 154 and the apex 142 of the domed portion 132 are aligned along an axis 158 of the bracket 120. The rim portion 152 has a tapered configuration and extends at an acute angle relative to the axis 158. In the embodiment illustrated in FIGS. 1–7D, the acute angle is about 45 degrees.

Referring to FIGS. 2–6, the back plate portion 122 includes a base portion 160 and first and second lateral portions 170 and 172, respectively. The base portion 160 has a generally flat configuration and extends along the length of the back plate portion 122. The base portion 160 has a first longitudinal edge portion 162 and an opposite second longitudinal edge portion 164 that merge with the first and second lateral portions 170 and 172, respectively.

The first and second lateral portions 170 and 172 extend along a substantial portion of the length of the base portion 160. The first and second lateral portions 170 and 172 extend from the first and second longitudinal edge portions 162 and 164, respectively, in directions transverse to the base portion 160. The first and second lateral portions 170 and 172 extend at acute angles relative to the plane of the base portion 160, generally upward and outward from an upper surface 190 of the base portion, as viewed in FIGS. 4–6.

Referring to FIGS. 3–6, the air bag module 10 includes means for connecting the bracket 120, and thus the module, to the vehicle (i.e., the seat frame 12). In the illustrated embodiment, two threaded studs 180 connect the bracket 120 to the seat frame 12. Those skilled in the art, however, will appreciate that alternative means may be used to connect the bracket 120 to the vehicle. In the illustrated embodiment, the studs 180 extend through the back plate portion 122 and are connected to the back plate portion by suitable means, such as a mechanical clinch fit, press fit, welding, or adhesive.

Each stud 180 (FIGS. 3 and 4) has a generally flat head portion 182 and an elongated shaft portion 184. The head portion 182 is positioned in abutting engagement with the upper surface 190 of the base portion 160. The shaft portion 184 extends through the base portion 160 and protrudes from a lower surface 192 of the base portion, opposite the upper surface 190.

Referring to FIGS. 3 and 4, the air bag module 10 may also include a positioning block 250. The positioning block 250 has a rectangular bottom surface 252 and a concave curved upper surface 254. A cylindrical aperture 260 extends through the positioning block 250 from the upper surface 254 to the bottom surface 252. A protrusion 262 extends from the upper surface 254 of the positioning block 250. The protrusion 262 has a generally convex surface 264 that includes a portion having a shape or contour similar to the concave surface 74 of the depression 72 on the inflator 40. The positioning block 250 may have any suitable construction, such as a molded plastic construction.

In an assembled condition, the bracket 120 receives and supports the inflator 40. The assembled condition is illustrated in FIGS. 3, 5, and 6. According to the present invention, the bracket 120 is configured to support the inflator 40 without requiring the use of threaded fasteners for connecting the inflator to the bracket. The first and second flange portions 130 and 150 are adapted to receive the first and second end portions 80 and 90, respectively, of the inflator 40. The bracket 120 has a resilience, provided by the construction and material properties of the bracket, such that the first and second flange portions 130 and 150 clamp onto the inflator 40 and provide a generally rigid support for the inflator.

Referring to FIGS. 3 and 5, when the inflator 40 is in the assembled condition, the domed surface 134 of the first flange portion 130 engages the domed outer surface 82 of the first end portion 80 of the inflator 40. The inflator 40 and bracket 120 are configured so as to provide a mating and abutting engagement between the surfaces 82 and 134. This mating and abutting engagement occurs preferably along a substantial portion or even the entire area of the domed portion 132 of the first flange portion 130.

Referring to FIGS. 3 and 6, when the inflator 40 is in the assembled condition, the terminal end portion of the inflator 40, i.e., the end portion 54 of the initiator 52, extends through the circular aperture 154 of the second flange portion 150. In the assembled condition, the tapered portion 92 of the second end portion 90 of the inflator 40 is presented towards the rim portion 152 of the second flange portion 150. The angled configuration of the tapered portion 92 coincides with the angled configuration of the rim portion 152. The tapered portion 92 is thus positioned in mating and abutting engagement with the rim portion 152.

Assembly of the inflator 40 and the bracket 120 is illustrated in FIGS. 7A–7D. The positioning block 250 is positioned on the bracket 120 with the bottom surface 252 engaging the upper surface 190 of the base portion 160. The positioning block 250 may be connected to the bracket 120 via means such as an adhesive or may be held in place by friction when positioned between the bracket and the inflator 40 while the bracket and inflator are in the assembled condition. In the assembled condition, the head portion 182 of one of the studs 180 is positioned in the aperture 260. The aperture 260 provides a clearance between the positioning block 250 and the stud 180 so as not to engage or otherwise interfere with the stud.

Referring to FIG. 7A, the inflator 40 is initially inserted into the bracket 120 at an angle toward the second flange portion 150 in a direction indicated generally by the arrow labeled 210 in FIG. 7A. The second end portion 90 is maneuvered such that the end portion 54 of the initiator 52 is directed through the circular aperture 154 of the second flange portion 150.

The first and second flange portions 130 and 150 may be angled relative to the back plate portion 122 toward each other at acute angles indicated generally at $\theta_1$ and $\theta_2$ in FIG. 7A, respectively. In general, the angles $\theta_1$ and $\theta_2$ are such that the first and second flange portions 130 and 150 are normally spaced from each other a distance less than the length of the inflator 40. More specifically, the angles $\theta_1$ and $\theta_2$ are such that the apex 142 of the first flange portion 130 and the center 156 of the second flange portion 150 are spaced from each other a distance less than the length of the inflator 40 as measured from an apex 230 of the first end portion 80 to the end surface 100.

While directing the second end 90 into the aperture 154, the first end portion 80 of the inflator 40 is maintained spaced from or adjacent the first flange portion 130 of the bracket 120. Also, the depression 72 in the inflator 40 is maintained in general alignment with the protrusion 262 on the upper surface 254 of the positioning block 250. The second end portion 90 is inserted into the aperture 154 such that the tapered portion 92 of the second end portion 90 is positioned adjacent the rim portion 152 of the second flange portion 150, as shown in FIG. 7A.

Referring to FIG. 7B, while maintaining the second end portion 90 in the general position attained in FIG. 7A, the inflator 40 is moved in a direction indicated generally by the arrow labeled 212 in FIG. 7B. In doing so, the first end portion 80 of the inflator 40 is moved toward the first flange portion 130 of the bracket 120. As the first end portion 80 moves toward the first flange portion 130, a terminal end portion 220 of the first end portion 80 enters the notch 136. The extent of the terminal end portion 220 is illustrated generally by the dashed line labeled 222 in FIG. 7B.

The notch 136 provides a clearance into which the terminal end portion 220 may extend while the inflator 40 is assembled with the bracket 120. As the first end portion 80 continues to move toward the first flange portion 130, a portion of the first end portion where the terminal end portion 220 merges with the remainder of the first end portion engages the curved edge 140 of the notch 136. This is identified generally at 224 in FIG. 7B.

Referring to FIG. 7C, as the inflator 40 continues to move in the direction 212, the first and second end portions 80 and 90 urge the first and second flange portions 130 and 150, respectively, away from each other as indicated by the arrows labeled 214 and 216 in FIG. 7C. The first and second flange portions 130 and 150 are urged away from each other against the resilience of the bracket 120. The first and second flange portions 130 and 150 move away from their original positions (indicated by dashed lines 130' and 150'), thus permitting the inflator 40 to be received in the bracket 120.

Referring to FIG. 7D, as the inflator 40 is moved further in the direction 212, the inflator "snaps" into the assembled position in the bracket 120. This assembled position is also illustrated in FIGS. 3, 5, and 6. The resilient quality of the bracket 120 causes the first and second flange portions 130 and 150 to move towards each other in respective directions identified by the arrows labeled 232 and 234 in FIG. 7D.

Since the first and second flange portions 130 and 150 are normally spaced apart from each other a distance less than the length of the inflator 40, the resilient quality of the bracket 120 causes the first and second flange portions 130 and 150 to exert a clamping force on the inflator 40. The clamping force provided by the first and second flange portions 130 and 150 provides a strong and rigid support for the inflator 40.

When in the assembled position of FIG. 3, the domed surface 134 of the first flange portion 130 has a mating and abutting engagement with the domed outer surface 82 of the first end portion 80. This mating and abutting engagement helps support the first end portion 80 of the inflator 40 along a substantial portion or even the entire area of the domed portion 132 of the first flange portion 130. This engagement of the abutting domed surfaces helps prevent movement of the first end portion 80 relative to the first flange portion 130 and thus may help prevent undesirable effects such as shaking or "rattling" of the inflator 40 in the bracket 120.

The rim portion 152 of the second flange portion 150 has a mating and abutting engagement with the tapered portion 92 of the inflator 40. This mating and abutting engagement of the rim portion 152 and the tapered portion 92 helps prevent movement of the second end portion 90 relative to the second flange portion 150 and thus also may help prevent undesirable effects such as shaking or "rattling" of the inflator 40 in the bracket 120.

When the inflator 40 and the bracket 120 are in the assembled condition of FIG. 3, the protrusion 262 of the positioning block 250 is positioned in the depression 72. The positioning block 250 helps position the inflator 40 relative to the bracket 120. This helps to ensure that the orientation of the diffuser ports 68 is maintained in a desired direction. As illustrated in FIG. 3, the group 70 of diffuser ports 68 adjacent the depression 72 is directed toward the positioning block 250. The opposite group 70 of diffuser ports 68 is directed away from the back plate portion 122.

The bracket 120 provides a rigid support of the inflator 40 by the bracket 120. By "rigid support", it is meant that the first flange portion 130 is maintained in abutting engagement with the first end portion 80 and the second flange portion 150 is maintained in abutting engagement with the second end portion 90. This rigid support helps prevent a loose fit or rattling of the inflator 40 in the bracket. Depending on the material construction (e.g., strength and/or hardness of metal) and the configuration of the bracket 120 (e.g., the degree to which the flanges 130 and 150 are angled toward each other), the bracket may provide a predetermined amount of clamping force on the inflator 40. Thus, the force required to remove the inflator 40 from the bracket 120 may be set to a desired level.

Advantageously, the notch 136 helps the bracket 120 provide this rigid support of the inflator 40. The notch 136, receiving the terminal end portion 220 (FIG. 7B), helps to limit the degree to which the first and second flange portions 130 and 150 are deflected away from each other while inserting the inflator 40 in the bracket 120. This helps to reduce or eliminate plastic deformation of the bracket 120, which would reduce the resilient tendency of the first and second flange portions 130 and 150 to return to the normal condition, and thus reduce the clamping force exerted on the inflator 40 by the bracket.

Referring to FIG. 7B, it will be appreciated that, if the notch 136 was omitted, an annular edge portion 240 of the first flange portion 130 would engage the outer surface 82 of the first end portion 80. This would increase substantially the degree to which the first flange portion 130 would be deflected while inserting the inflator 40. This is indicated by the first flange portion illustrated in dashed lines at 130' in FIG. 7B. This might also increase the degree to which the second flange portion 150 would be deflected while inserting the inflator 40. Those skilled in the art will appreciate that the increased deflection of the first and second flange portions 130 and 150 is undesirable because it may result in plastic deformation of the bracket 120 which, as stated above, may reduce the clamping force applied to the inflator 40.

As a further advantage, the present invention eliminates the need for additional means, such as fasteners and/or clamps, for connecting the inflator 40 to the bracket 120. The construction of the bracket 120 is such that the clamping force applied to the inflator 40 by the first and second flange portions 130 and 150 is sufficient to provide the requisite support for the inflator. The clamping force provided by the bracket 120 is sufficient to retain the inflator 40 in the bracket throughout inflation and deployment of the air bag 30.

The bracket 120, constructed in accordance with the teachings of the present invention, thus simplifies the assembly of the air bag module 10. The present invention also reduces the number of parts required to construct the air bag module 10. This may help provide a more efficient assembly of the air bag module 10 and may also help reduce manufacturing costs associated with producing the module.

Referring to FIGS. 1 and 2, once the inflator is assembled with the bracket 120, the assemblage is inserted into the air bag 30 and the cover 32. The studs 180 extend through fastener openings in the air bag 30 and the cover 32. The lead wires 36 extend out of the air bag 30 through another opening (not shown) in the air bag. Fasteners 242, such as nuts, secure the module 10 to the seat frame member 12 in the seatback 18.

Upon the occurrence of an event for which occupant protection is desired, the initiator 52 is actuated and the inflator 40 provides inflation fluid for inflating the air bag 30 in a known manner. As the inflation fluid flows from the inflator 40, fluid flow through the diffuser ports 68 facing the back plate portion is blocked by the positioning block 250. The inflation fluid is thus directed to flow through the diffuser ports 68 opposite the back plate portion 122, i.e., toward the air bag 30. This may be desirable where a thrust neutral inflator is required. Alternatively, the positioning block may be altered (e.g., shortened) so as not to block inflation fluid flow from the diffuser ports 68. In this instance, the fluid directed toward the back plate portion 122 (FIGS. 2–6) would be directed away from the back plate portion and around the inflator into the air bag 30 by the first and second lateral portions 170 and 172. As another alternative, the inflator 40 may be rotated such that both groups of diffuser ports 68 are directed away from the back plate portion 122. For example, the inflator 40 could be rotated ninety degrees about the axis 60 (that is, if the configuration of the air bag 30 permits). In this instance, the depression 72 would also be moved ninety degrees.

The inflating air bag 30 (FIGS. 1 and 2) breaks through the portions of the seatback 18 that overlie the module 10, such as foam cushion material and/or fabric material or leather covering of the seat. The air bag 30 inflates from the folded, stored condition to an inflated condition as illustrated in FIG. 1. When in the inflated condition, the air bag 30 may thus help protect an occupant of the vehicle.

A second embodiment of the present invention is illustrated in FIG. 8. The second embodiment of the invention is similar to the first embodiment of the invention illustrated in FIGS. 1–7D. Accordingly, numerals similar to those of FIGS. 1–7D will be utilized in FIG. 8 to identify similar components, the suffix letter "a" being associated with the numerals of FIG. 8 to avoid confusion. The apparatus 10a of the second embodiment of the present invention is similar to the apparatus 10 of the first embodiment (FIGS. 1–7D), except that the positioning block is omitted.

Referring to FIG. 8, the inflator 40a and the bracket 120a have a similar construction to those of the first embodiment (FIGS. 1–7D). In the second embodiment, the bracket 120a (FIG. 8) includes a protrusion in the form of a tab portion 270 for cooperating with the depression 72a to help position the inflator 40a relative to the bracket. The tab portion 270 comprises a portion of the back plate portion 122a that is punched, stamped, or otherwise formed from the single piece of material used to construct the bracket 120a.

The tab portion 270 projects from the upper surface 190a of the back plate portion 122a and into the depression 72a while the inflator 40a and the bracket 120a are in the assembled condition. As shown in FIG. 8, the tab portion 270 may have a curved configuration so as to provide a curved convex outer surface 272 that mates with the curved concave surface 74a of the depression 72a.

In the embodiment illustrated in FIG. 8, the second flange portion of the bracket and the second end portion of the inflator have a different configuration than the inflator and bracket illustrated in FIGS. 1–7D. The tab portion 270 of FIG. 8 may also be incorporated with the bracket and inflator construction of FIGS. 1–7D. Likewise, the positioning block of FIGS. 1–7D could be incorporated with the bracket and inflator construction of FIG. 8.

In the alternate bracket and inflator configuration of FIG. 8, the rim portion of the second flange extends perpendicular to the back plate portion. The rim portion is biased toward an annular end surface of the inflator. An O-ring is disposed between the rim portion and the annular end surface. The O-ring is compressed between the annular end surface and the rim portion when the second flange clamps onto the inflator.

From the above description of the invention, those skilled in the art will perceive improvements, changes and modifications in the invention. For example, in the illustrated embodiment, the bracket is depicted as a bracket for supporting an inflator for a side impact air bag module. The bracket could, however, be used to support an inflator for alternative inflatable vehicle occupant protection devices, such as front impact air bags and inflatable side curtains. Such improvements, changes and modifications within the skill of the art are intended to be covered by the appended claims.

What is claimed is:

1. An apparatus for helping to protect an occupant of a vehicle that includes a seat, said apparatus comprising:

an inflatable vehicle occupant protection device inflatable from a deflated condition to an inflated condition;

a bracket comprising an elongated back plate portion and spaced first and second flange portions extending transverse to said back plate portion;

an inflator actuatable to provide inflation fluid for inflating said inflatable vehicle occupant protection device, said inflator having a first end portion and an opposite second end portion, said inflator being insertable into said bracket; and means for connecting said bracket to the seat;

said first end portion engaging said first flange portion and said second end portion engaging said second flange portion while said inflator is inserted in said bracket, said inflator urging said first and second flange portions to deflect away from each other while said inflator is inserted in said bracket, said first and second flange portions being urged toward each other by resilience of said bracket and exerting a clamping force on said inflator to retain said inflator in said bracket;

said bracket being free from side walls extending transverse to said back plate portion and intersecting said first and second flange portions, said apparatus being free from any other means for connecting said inflator to said bracket.

2. The apparatus as recited in claim 1, wherein said first end portion of said inflator has a domed outer surface, said first flange portion of said bracket having a domed portion with a domed surface for receiving said domed outer surface of said first end portion, a central axis of said inflator extending through said domed portion when said inflator is retained in said bracket, said first flange portion including a notch in said domed portion that provides a clearance through which a terminal end portion of said first end portion is extendable while inserting said inflator into said bracket.

3. Apparatus as recited in claim 2, wherein said inflator has a longitudinally extending axis, said first and second end portions being spaced apart along said axis, said inflator further including a cylindrical central portion centered on said axis and extending between said first and second end portions.

4. Apparatus as recited in claim 3, wherein said second flange portion comprises a rim portion defining a circular aperture, said second end portion of said inflator including a terminal cylindrical first portion centered on said axis and having a first diameter, an adjacent cylindrical second portion centered on said axis and having a second diameter greater than said first diameter, and an annular shoulder portion extending between said first and second portions, said first portion extending through said aperture in said second flange portion and said annular shoulder portion forming an interference fit with said rim portion while said inflator is supported by said bracket.

5. Apparatus as recited in claim 2, wherein said second flange portion comprises a rim portion defining a circular aperture, said second end portion of said inflator extending through said aperture and including an annular shoulder portion that forms an interference fit with said rim portion while said inflator is supported by said bracket.

6. Apparatus as recited in claim 2, wherein said notch is positioned on said domed portion of said first flange portion radially opposite said back plate portion.

7. Apparatus as recited in claim 1, wherein said first and second flange portions extend at acute angles relative to an upper surface of said back plate portion towards each other.

8. Apparatus as recited in claim 1, wherein said back plate portion, said first flange portion, and said second flange portion are constructed as a single piece of material, said first and second flange portions being urged towards each other by resilience of said material to clamp onto said inflator.

9. Apparatus as recited in claim 1, wherein said back plate portion includes a base portion having a flat configuration and extending along the length of said bracket from said first flange portion to said second flange portion, said base portion having an upper surface presented toward said inflator when said inflator is supported by said bracket, said back plate portion further including first and second lateral portions extending from opposite lateral edges of said base portion at acute angles relative to a plane of said base portion, said first and second lateral portions extending along a substantial portion of the length of said back plate portion measured along an axis of said bracket extending longitudinally from said first flange portion to said second flange portion.

10. Apparatus as recited in claim 9, wherein said bracket includes a protrusion extending from said upper surface of said base portion, said inflator including a depression in said central portion for receiving said protrusion, said protrusion and said depression engaging each other to help maintain said inflator positioned relative to said bracket while said inflator is inserted in said bracket.

11. Apparatus as recited in claim 9, wherein said central portion of said inflator extends along said back plate portion while supported by said bracket, said inflator including first and second groups of diffuser ports for directing inflation fluid from said inflator, said first and second groups of diffuser ports being positioned radially opposite each other on said inflator, said first group of diffuser ports being positioned facing said upper surface of said back plate portion while said inflator is inserted in said bracket.

12. Apparatus as recited in claim 11, wherein said base portion and said first and second lateral portions help direct inflation fluid provided by said inflator away from said bracket and around said inflator into said inflatable vehicle occupant protection device.

13. Apparatus as recited in claim 9, further comprising a positioning block having a lower surface engaging said upper surface of said base portion and a curved upper surface in mating and abutting engagement with said central portion of said inflator, said positioning block including a protrusion extending from said curved upper surface, said inflator including a depression in said central portion for receiving said protrusion, said protrusion and said depression engaging each other to help maintain said inflator positioned relative to said bracket while said inflator is inserted in said bracket.

14. Apparatus as recited in claim 13, wherein said central portion of said inflator extends along said back plate portion while supported by said bracket, said inflator including first and second groups of diffuser ports for directing inflation fluid from said inflator, said first and second groups of diffuser ports being positioned radially opposite each other on said inflator, said first group of diffuser ports being positioned facing said upper surface of said back plate portion while said inflator is inserted in said bracket, said positioning block at least partially blocking inflation fluid flow through said first group of diffuser ports when said inflator is inserted in said bracket.

15. Apparatus as recited in claim 1, further comprising means for connecting said bracket to the vehicle to support said bracket and said inflator in the vehicle.

16. Apparatus as recited in claim 15, wherein said bracket is connectable to a vehicle seat to support said bracket and said inflator in the seat.

17. A bracket for supporting an airbag inflator in a vehicle, the inflator having a cylindrical side wall centered on an axis, a domed first end portion centered on the axis, and a second end portion opposite the first end portion, said bracket comprising:
an elongated back plate portion;
a first flange portion extending from a first end of said back plate portion in a direction transverse to said back plate portion; and
a second flange portion extending from a second end of said back plate portion opposite said first end in a direction transverse to said back plate portion;

said first flange portion having a domed portion for receiving and mating with the domed first end portion of the inflator with the axis of the inflator extending through an apex of the domed first end portion, said first flange portion including a notch in said domed portion for providing a clearance through which a terminal domed end portion of the first end portion of the inflator extends while being inserted into said bracket, said second flange portion receiving the second end portion of the inflator.

18. An apparatus for helping to protect an occupant of a vehicle, said apparatus comprising:
an inflatable vehicle occupant protection device inflatable from a deflated condition to an inflated condition;
an inflator actuatable to provide inflation fluid for inflating said inflatable vehicle occupant protection device, said inflator having a central axis, a domed first end portion centered on the central axis, and a second end portion opposite the first end portion; and
a bracket comprising an elongated back plate portion and spaced first and second flange portions extending transverse to said back plate portion;
said first flange portion having a domed portion for receiving and mating with said domed first end portion with said domed portion of said first flange encircling said central axis of the inflator, said first flange portion including a notch in said domed portion that provides a clearance through which a domed terminal end portion of said first end portion is extendable while said inflator is being inserted into said bracket, said second flange portion receiving said second end portion of said inflator.

19. An apparatus for helping to protect an occupant of a vehicle including a seat, said apparatus comprising:
an inflatable vehicle occupant protection device inflatable from a deflated condition to an inflated condition;
an inflator actuatable to provide inflation fluid for inflating said inflatable vehicle occupant protection device;
a bracket for supporting said inflator; and
means for connecting said bracket to the seat;
said inflator and said bracket having cooperating portions some of which deflect to enable said inflator and bracket to snap together into an assembled unit, said apparatus being free from any other means for connecting said inflator to said bracket, said cooperating portions comprising a portion for engaging a terminal axial end surface of said inflator and being free from openings or slits within its periphery.

20. An apparatus for helping to protect an occupant of a vehicle, said apparatus comprising:
an inflatable vehicle occupant protection device inflatable from a deflated condition to an inflated condition;
a bracket comprising an elongated back plate portion and spaced first and second flange portions extending transverse to said back plate portion, said first flange portion having a domed surface; and
an inflator actuatable to provide inflation fluid for inflating said inflatable vehicle occupant protection device, said inflator having a first end portion and an opposite second end portion, said inflator being insertable into said bracket;
said first end portion engaging said domed surface of said first flange portion and said second end portion engaging said second flange portion while said inflator is inserted in said bracket, said inflator urging said first and second flange portions to deflect away from each other while said inflator is inserted in said bracket, said first and second flange portions being urged toward each other by resilience of said bracket and exerting a clamping force on said inflator to retain said inflator in said bracket, a central axis of said inflator extending through said domed surface while said inflator is inserted in said bracket.

21. An apparatus for helping to protect an occupant of a vehicle, said apparatus comprising:
an inflatable vehicle occupant protection device inflatable from a deflated condition to an inflated condition;
a bracket comprising an elongated back plate portion and spaced first and second flange portions extending at an acute angle with an upper surface of said back plate portion; and
an inflator actuatable to provide inflation fluid for inflating said inflatable vehicle occupant protection device, said inflator having a first end portion and an opposite second end portion, said inflator being insertable into said bracket;
said first end portion engaging said first flange portion and said second end portion engaging said second flange portion while said inflator is inserted in said bracket, said inflator urging said first and second flange portions to deflect away from each other while said inflator is inserted in said bracket, said first and second flange portions being urged toward each other by resilience of said bracket and exerting a clamping force on said inflator to retain said inflator in said bracket.

22. An apparatus for helping to protect an occupant of a vehicle, said apparatus comprising:
an inflatable vehicle occupant protection device inflatable from a deflated condition to an inflated condition;
a bracket comprising an elongated back plate portion and spaced first and second flange portions extending transverse to said back plate portion, said back plate portion comprising a generally flat base portion and first and second lateral portions extending from opposite lateral edges of said base portion at acute angles relative to a plane of said base portion; and
an inflator actuatable to provide inflation fluid for inflating said inflatable vehicle occupant protection device, said inflator having a first end portion and an opposite second end portion, said inflator being insertable into said bracket;
said first end portion engaging said first flange portion and said second end portion engaging said second flange portion while said inflator is inserted in said bracket, said inflator urging said first and second flange portions to deflect away from each other while said inflator is inserted in said bracket, said first and second flange portions being urged toward each other by resilience of said bracket and exerting a clamping force on said inflator to retain said inflator in said bracket.

* * * * *